Patented Oct. 12, 1954

2,691,656

UNITED STATES PATENT OFFICE 2,691,656

1-METHYL-3-PIPERIDYLMETHYL 2-CYCLO-ALKYL - 4 - METHYLPENTANOATES AND SALTS THEREOF

Rolland F. Feldkamp, Troy, N. Y., assignor to Sterling Drug Inc., New York, N. Y., a corporation of Delaware No Drawing. Application July 20, 1951, Serial No. 237,823

5 Claims. (Cl. 260—294.3)

This invention relates to new chemical compounds, 1-methyl-3-piperidylmethyl 2-cycloalkyl-4-methylpentanoates having the formula

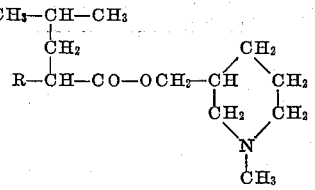

wherein R is a cyclopentyl or a cyclohexyl radical; and to water-soluble, non-toxic acid-addition and quaternary ammonium salts thereof.

These new compounds have useful pharmacological properties and are particularly valuable as anticholinergic agents of very high potency; for example, the compound where R is cyclopentyl has a potency about double that of atropine.

The method for preparing these new substances comprises the reaction of the acid chloride of a 2-cycloalkyl - 4 - methylpentanoic acid with 1-methyl-3-piperidylmethanol. The reaction is effected by admixture of the two components, preferably in the presence of an inert organic solvent, and heating is advisable to hasten the reaction. The free basic ester is obtained by addition of alkali to the reaction mixture.

The basic esters can be converted to an acid-addition salt by the addition, preferably in non-aqueous medium, of a therapeutically acceptable acid, as, for example, hydrogen chloride in ether or alcohol solution. The quaternary ammonium salts of the new basic esters are prepared by mixing the free basic esters with a lower-alkyl or aralkyl ester of a strong inorganic acid or organic sulfonic acid, preferably in an inert organic solvent such as benzene or ether, optionally with gentle heating. The quaternary ammonium salt either crystallizes immediately or can be obtained by concentration of the solvent.

The acids which may be used to prepare acid-addition salts are those which produce, when combined with the basic esters, salts whose anions are relatively innocuous to the animal organism in therapeutic doses of the salts, so that the beneficial physiological properties inherent in the basic esters are not vitiated by side-effects ascribable to the anions. Appropriate acid-addition salts are those derived from mineral acids, such as hydrochloric acid, hydrobromic acid, hydriodic acid and sulfuric acid; and organic acids such as acetic acid, citric acid and tartaric acid. The quaternary ammonium derivatives are obtained by the addition to the free basic ester of alkyl or aralkyl esters of inorganic acids or organic sulfonic acids, such as methyl chloride, methyl bromide, methyl iodide, ethyl bromide, propyl chloride, benzyl chloride, benzyl bromide, methyl sulfate, methyl benzenesulfonate and methyl p-toluenesulfonate.

The following example will further illustrate the invention.

Example

A solution of 15.2 g. (0.075 mole) of 2-cyclopentyl - 4 - methylpentanoyl chloride [prepared from 2-cyclopentyl-4-methylpentanoic acid and thionyl chloride according to Moffett et al., J. Org. Chem. vol. 15, 352 (1950)] in 50 cc. of benzene was heated to reflux, and a solution of 9.67 g. (0.075 mole) of 1-methyl-3-piperidylmethanol (prepared as described in my co-pending application, Serial No. 122,366, filed October 9, 1949, now abandoned) in 50 cc. of benzene was slowly added. The mixture was heated for a short time longer, cooled and evaporated to dryness. The residue was dissolved in water, the solution was extracted with ether and the aqueous layer was made basic with 10% sodium carbonate solution. The free base was extracted with ether, and the ether solution was dried over anhydrous magnesium sulfate. A small sample of the dried ether solution was saturated with hydrogen chloride gas. The hydrochloride of 1 - methyl - 3 - piperidylmethyl 2-cyclopentyl-4-methylpentanoate precipitated as an oil which could not be induced to solidify. A similar sample with hydrogen bromide likewise gave the hydrobromide which also was an oil. The main part of the ether solution was treated with gaseous methyl bromide. A semi-solid precipitate, M. P. 90–150° C., was obtained. After several recrystallizations from an ether-ethyl acetate mixture and finally from ethyl acetate alone, 5.9 g. of the methobromide of 1-methyl - 3 - piperidylmethyl 2 - cyclopentyl - 4-methylpentanoate, M. P. 159.6–162.6° C. (corr.) was obtained.

Anal.—Calcd. for $C_{19}H_{36}BrNO_2$: C, 58.45; H, 9.29; Br, 20.47. Found: C, 58.49, 58.43; H, 9.08, 9.07; Br, 20.55.

By the method described in the above example 1 - methyl - 3 - piperidylmethyl 2 - cyclohexyl - 4-methylpentanoate can be prepared by the reaction of 2-cyclohexyl-4-methylpentanoyl chloride and 1-methyl-3-piperidylmethanol. The free base, acid-addition salts and quaternary ammonium salts of 1-methyl-3-piperidylmethyl 2-cyclohexyl-4-methylpentanoate can be obtained by the methods described above for the corresponding cyclopentyl derivative. 2 - cyclohexyl - 4 - methylpentanoyl chloride can be prepared by the reaction of 2-cyclohexyl-4-methylpentanoic acid and thionyl chloride, and 2-cyclohexyl-4-methylpentanoic acid in turn can be prepared by alkylation of the sodio derivative of diethyl cyclohexylmalonate with an isobutyl halide, followed by hydrolysis and decarboxylation.

I claim:

1. A compound selected from the group consisting of 1-methyl-3-piperidylmethyl 2-cycloalkyl-4-methylpentanoate having the formula

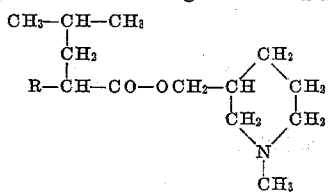

wherein R is a member of the group consisting of cyclopentyl and cyclohexyl; and water-soluble, non-toxic acid-addition and quaternary ammonium salts thereof.

2. A water-soluble, non-toxic quaternary ammonium salt of 1-methyl-3-piperidylmethyl 2-cyclopentyl-4-methylpentanoate having the formula

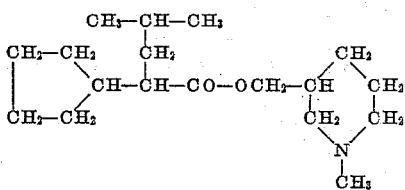

3. 1-methyl-3-piperidylmethyl 2-cyclopentyl-4-methylpentanoate methobromide having the formula

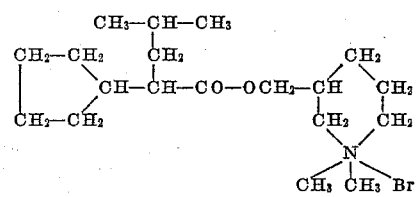

4. 1-methyl-3-piperidylmethyl 2-cyclopentyl-4-methylpentanoate.

5. A water-soluble, non-toxic acid-addition salt of 1-methyl-3-piperidylmethyl 2-cyclopentyl-4-methylpentanoate.

References Cited in the file of this patent

UNITED STATES PATENTS

| Number | Name | Date |
|---|---|---|
| 2,506,605 | Martin | May 9, 1950 |
| 2,507,449 | Martin | May 9, 1950 |
| 2,533,003 | Feldkamp | Dec. 5, 1950 |
| 2,538,793 | Moffett | Jan. 23, 1951 |